May 27, 1952 G. MUFFLY 2,598,284
APPARATUS FOR MEASURING INTENSITY OF MAGNETIC FIELDS
Original Filed June 23, 1947
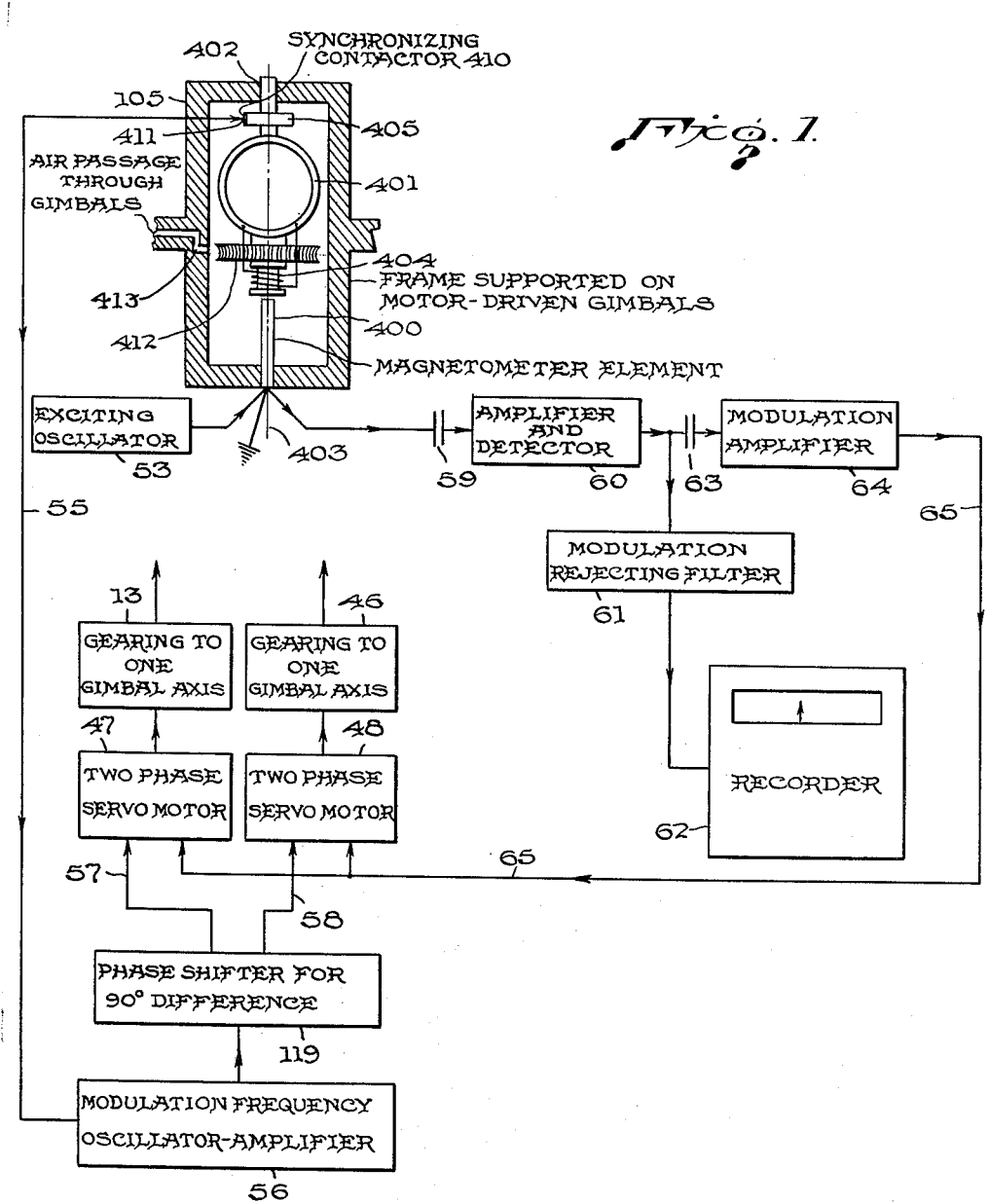
INVENTOR.
GARY MUFFLY
BY
HIS ATTORNEY Patented May 27, 1952

2,598,284

UNITED STATES PATENT OFFICE 2,598,284

APPARATUS FOR MEASURING INTENSITY OF MAGNETIC FIELDS

Gary Muffly, Penn Township, Allegheny County, Pa., assignor to Gulf Research & Development Company, Pittsburgh, Pa., a corporation of Delaware Original application June 23, 1947, Serial No. 756,426. Divided and this application May 3, 1951, Serial No. 224,303

3 Claims. (Cl. 177—380)

This invention concerns a magnetometer for measuring the total intensity of a magnetic field. In particular, it concerns an improved form of self-orienting total-intensity magnetometer suitable for use on a moving, tilting or gyrating vehicle for measuring the total intensity of a magnetic field.

This application is a division of my copending application Serial No. 756,426 entitled Apparatus for Measuring Intensity of Magnetic Field, filed June 23, 1947, now U. S. Patent No. 2,564,854, issued August 21, 1951 and assigned to the same assignee as the present invention.

Apparatus for measuring the intensity of a magnetic field for various purposes is well known. Many types of magnetometers suitable for special purposes are known in the prior art. The early magnetometers which were used particularly for measuring magnetic field intensity of the earth were required to be set up on a fixed support and it was necessary to orient their axes of sensitivity manually in the direction of the particular vector whose intensity was to be measured. In surveys of the earth's magnetic field the direction of the total vector was not known in advance and it was therefore customary to measure terrestrial components independently, from which the total vector could afterwards be computed.

In copending application Serial No. 508,550, filed November 1, 1943 by Vacquier and Muffly, now Patent No. 2,555,209, there is disclosed an apparatus which may be used for making magnetic surveys from a moving vehicle. One embodiment shown in application Serial No. 508,550 employs a detecting element of a type shown in Vacquier Patent No. 2,406,870 mounted in a universal support and having its direction of orientation in space stabilized by means of auxiliary magnetically-sensitive elements so that a desired component of the magnetic field may be measured as the magnetometer is moved about.

Another embodiment which is shown in application Serial No. 508,550 employs a Vacquier detecting element mounted in a universal support with means for simultaneously oscillating the magnetometer element about two mutually-perpendicular axes in such a way that the detecting element undergoes the magnetic field in various directions, these directions forming the elements of a cone whose axis is the average direction of the magnetometer element. The normal output signal of the detecting element is thereby modulated as a result of the directional displacements and the signal is analyzed into its quadrature components of modulation, which quadrature components are applied to two servomotors respectively so that the latter tend to orient the average axis of the magnetometer so as to reduce the modulation to a minimum. When the magnetometer is thus oriented, its signal output is a measure of the total magnetic vector and the device is a self-orienting total vector magnetometer.

Copending application Serial No. 756,426, of which the present application is a division, discloses and claims a magnetometer in which the sensitive element is not nutated as described above, but its instantaneous axis of sensitivity is caused to nutate by rotating about one end of the sensitive element an axially-asymmetrical magnetic vane. The asymmetrical vane produces an angular displacement of the instantaneous axis of sensitivity of the element with respect to the geometric axis of the element, and the rotation of the vane brings about a revolution of the instantaneous axis of sensitivity into various positions defining a cone, thus effectively nutating the instantaneous axis of sensitivity about the geometric axis. As a result of the nutation of the instantaneous axis of sensitivity of the sensitive element, its output signal is modulated in proportion and phase which are related to the angular displacement of the axis of the element from alignment with the direction of the ambient total magnetic vector.

The present invention concerns a magnetometer in which the output signal of the sensitive element is in another manner modulated in proportion and phase which are related to the angular misalignment of the magnetometer from the total magnetic vector. Instead of effecting a nutation of the axis of sensitivity of the magnetic element to produce an output signal whose modulation is a measure of the misorientation in the ambient field, the present invention contemplates rotating an earth-inductor coil about a diametral axis which coincides with the geometric axis of the magnetic element, and coupling its output to that of the latter. The coupling coil may rotate with the inductor coil, thereby eliminating the need for slip rings or flexible connections between the indicator coil and the coupling coil.

It is accordingly an object of the invention to provide a method and apparatus for measuring the total intensity of a magnetic field from a moving and tilting support.

Another object of this invention is to provide a method of sampling the magnetic field in various directions with a magnetically-responsive element and of utilizing the resulting signals for orienting a measuring element substantially in the direction of the magnetic vector.

Another object of this invention is to provide a magnetometer which measures the total intensity of a magnetic field to a high degree of precision.

Another object of this invention is to provide an improved form of magnetometer which measures the total intensity of a magnetic field even though mounted on a moving and tilting support.

A further object of this invention is to provide a method by which a magnetometer signal is modulated in a manner from which any deviation of the direction of orientation of the magnetometer element from the direction of the magnetic field may be corrected.

A further object of this invention is to provide apparatus whereby a magnetometer signal may be modulated in a manner so that the modulation signal is a measure of the deviation of the magnetometer axis from the direction of the magnetic field.

A further object of this invention is to provide a method and apparatus of modulating the signal from a directionally-sensitive magnetometer in a manner which will depend on the directional orientation of the magnetometer in the magnetic field, said modulation being accomplished without moving the sensitive detecting element itself.

These and other objects are attained in a manner which will be apparent from the following specification of which the accompanying drawing forms a part, and in which—

Fig. 1 shows an embodiment of the invention, together with its schematic wiring diagram, in which the signal output of the magnetic-detecting element is modulated by means of an associated earth-inductor coil in proportion and phase related to the magnitude and direction of misalignment of the principal axis of the magnetometer from the direction of the total magnetic vector.

Referring to Fig. 1 a rigid frame 105 made of electrically non-conducting, non-magnetic material, carries at one side a bearing 402 in which is rotatably mounted an earth-inductor coil 401. At the opposite side of the frame is rigidly mounted a magnetic-measuring element 400, this element having a principal axis 403 which coincides with the rotation axis of coil 401. The frame 105 is mounted in a universal mounting, such as gimbals (not shown). Rigidly connected to coil 401 and rotating on the same axis, is a commutator 405 whose function will be described later. Also rigidly connected to coil 401 is a coil 404 whose axis coincides with the axis 403 and the axis of element 400. The coil 401 is electrically connected to coil 404, and the latter is located close to the element 400 so that it is electromagnetically coupled to the element 400. The rotatable assembly comprising contactor 405, coil 401, and coil 404, is rotated by means of a turbine wheel 412 attached thereto and upon which impinges a stream of compressed air from air jet 413. In this manner the earth-inductor coil 401 is maintained in rotation. If desired, a centrifugal governor (not shown) may be attached to the rotating system to control its speed. Compressed air from a pump (not shown) is supplied to the air jet 413 through passages in the gimbals (not shown).

When the direction of the ambient magnetic field coincides with axis 403, no E. M. F. is generated in the rotating coil 401. Any deviation of the axis 403 from coincidence with the total ambient magnetic vector will cause a voltage to be generated in coil 401 which is in proportion to the deviation and with a phase corresponding to the direction of the deviation. Any output from coil 401 passes through coil 404, the latter being electrically in series therewith. The current in 404 will lag the voltage generated in 401 by a small amount, but this phase shift can be taken care of by means of a phase shifter elsewhere in the circuit as will appear later. The rotation frequency of coil 401 should be less than the excitation frequency of the magnetic element 400 and may be of the same order as the nutation frequency employed in embodiments described in the aforementioned copending application Serial No. 756,426. A rotational speed of about 3600 R. P. M. is convenient.

The current in coil 404 sets up an axial field in element 400 which alternately adds to and subtracts from the normal output of the latter in a manner similar to that of the previously-described embodiments employing nutations. Coils 401 and 404 may have any desired number of turns and are preferably matched in impedance. Coil 401 may comprise a single turn, in which case coil 404 should also have only a few turns in order to obtain a maximum transfer of energy to the detector element.

A grounded conducting segment 410 in commutator 405, which rotates with the coils 401 and 404, together with a fixed contact brush (indicated in Fig. 1 diagrammatically by arrow 411) bearing against the commutator, permit of obtaining a phasing signal for analyzing the modulation signal from element 400 into components for controlling the orienting mechanisms as will be described.

The orientation of the axis 403 of frame 105 is controlled by servomotors (not shown) which are mechanically connected to rotate the frame about the respective gimbal axes in well-known manner, such as through the agency of belts or gears. These mechanical connections are schematically indicated in Fig. 1 by blocks 13 and 46, the servomotors themselves being schematically indicated by blocks 47 and 48. The operation of the motor-control and other circuits will now be described.

The sensitive element 400, which may be of the type shown in Vacquier Patent No. 2,406,870, is excited by an oscillator 53 as described in said patent. Electrical connections leading to and from the element 400, the ground return, as well as any other connections which may be necessary to operate servomotors 47 and 48, may conveniently be carried by flexible leads through hollow gimbals (not shown) or by means of brushes and slip rings (not shown) in well-known manner. As previously suggested, the frequency of the exciting oscillator 53 should be considerably higher than the rotation frequency of coil 401. A frequency of 1000 C. P. S. has been found satisfactory for oscillator 53.

The output signal from the sensitive element 400 passes through condenser 59 to amplifier and demodulator 60. The demodulator in unit 60 is of conventional design and produces an output having a D.-C. component in proportion to the strength of the high-frequency output signal in the same manner as a detector in a radio receiver produces a D.-C. component usually employed for avc. The demodulator 60 also produces an A.-C. component which is proportional to the amplitude of modulation, also in a manner similar to that of a radio-receiver detector. The D.-C. component of the demodulated signal output is transferred through low-pass filter 61 to recorder 62 which will be described later. Low-pass filter 61 is for the purpose of rejecting the modulation signal and keeping it out of the recorder 62. Circuit 61 is conventional and may comprise two resistors and a condenser as is well known. The A.-C. modulation signal output from the amplifier-demodulator 60 passes through the condenser 63 to the modulation amplifier 64 whose output is carried by connection 65 to both servomotors 47 and 48.

Contactor 405 closes a circuit to brush 411 each time the earth-inductor coil 401 rotates and the contact is closed at a particular point in the rotation. Alternatively, contactor 405 may be arranged so that the segment 410 is an insulating segment in which case the circuit is opened thereby. Through the connection 55 the contactor 405 controls the frequency of an oscillator in unit 56 which supplies power through leads 57 and 58 to the respective servomotors 47 and 48. The contactor also maintains the phase of the oscillator. The position of the brush 411 may be adjusted to the necessary angle to compensate phase shifts occurring elsewhere in the circuit. The unit indicated by block 56 comprises conventional circuits which perform the functions of an oscillator and amplifier. The oscillator may comprise a gas tube relaxation oscillator or a multivibrator. Oscillators of this type may be made to lock in with the impulse applied from the contactor 405 by adjusting the oscillator 56 to the approximate frequency of the contactor and applying the impulse from connection 55 to the grid circuit of a gas triode tube which forms an element of the oscillator 56. The locked-in oscillator may be followed by a tuned amplifier comprising one or more tuned stages of amplification which will eliminate undesired harmonics.

The output of the oscillator-amplifier 56 may be split into two phases approximately 90° apart by means of a phase splitter 119. Any of the known types of phase shifting networks may be used for this purpose. One simple and well known way of accomplishing such a phase shift is to use a capacity of suitable value in series with the winding of one servomotor 48. If it is desired to shift the phase of both motors simultaneously, this may be done by altering the tuning of the amplifier in unit 56 by adjusting the capacity or inductance in one or more of its tuned stages.

Servomotors 47 and 48 are of a two-phase type as previously mentioned and the power supplied through circuit 57 is approximately 90° out of phase with that supplied through circuit 58. Only one phase of each motor is supplied from oscillator 56, the other phase being supplied from the modulated output of the sensitive element through lead 65 as already explained.

The orienting servomotors 47 and 48 are conveniently of the two-phase A.-C. type. One phase of each motor is energized continuously by A.-C. which is generated in synchronism with the rotation of coil 401 and obtained from units 56 and 119. If necessary the power in leads 57 and 58 may be amplified up to a suitable power level of a few watts and adjusted to the proper phase. This power is supplied to the two motors 47 and 48 in phases differing by 90°, that is the power in circuit 57 supplying one phase of motor 47 is 90° out of phase from the power in circuit 58 supplying one phase of motor 48. The other phase of each motor is energized in proportion to the output modulation of element 400 and is supplied through circuit 65 as explained. It also follows the phase of the magnetometer's output modulation. Now, if a modulation is present in the magnetometer-output signal and the two windings of either motor are excited in exactly the same phase, the motor will not run. This condition should obtain when the alignment error, i. e. misalignment between the axis 403 of element 400 and the direction of the ambient total magnetic vector, is at right angles to the gimbal action of the motor in question. It may always be made so by inserting the proper amount of phase shift in a suitable place in the circuit by conventional phase-shifting means. Under the same conditions, the other motor will be arranged to receive voltages differing 90° in phase so that it will run in the correct sense with an output limited only by the amount of modulation. An error of quite a few degrees in the servomotor supply phase adjustments is not serious, as then the magnetometer orientation is restored along a curved or spiral path which is not seriously longer than the ideal straight radial path. By way of example, a suitable orienting motor which may be used is the Kollsman 60 cycle, model 776–02. Its 60 C. P. S. frequency represents a reasonable rotational speed for the rotation of coil 401 and the motor is capable of quickly stopping or reversing and requires only about 5 watts per phase.

In the operation of the apparatus, if the axis 403 of the sensitive element 400 is in the direction of the total magnetic vector, its output signal will have no modulation. This is because the axis of rotation of coil 401 will then be parallel with the magnetic vector and no E. M. F. will be generated in coil 401. Therefore, the output signal from element 400 will be a steady unmodulated A.-C. whose value after amplification and demodulation (rectification) will be recorded by recorder 62. Since there will be no signal in lead 65, the servomotors will not be actuated. Any misplacement of the axis of the magnetometer element with the direction of total magnetic vector will cause a variation in the field undergone by element 400 during the cycle of rotation of coil 401, resulting in modulation of the output from the element 400, which in turn gives rise to a signal in lead 65. The phase of this signal in lead 65 will determine which of the motors 47 and 48 will be caused to rotate and thus bring the magnetometer back to the normal unmodulated position.

The amplified signal representing the unmodulated output of the detector element 300 is recorded by recorder 62 which may be of the self-balancing potentiometric type. In order to increase the precision of the reading on recorder 62 the greater part of the field being measured by element 400 may be balanced out by a D.-C. current supplied to the output circuit of the magnetometer element 400 as described in co-pending application Serial No. 756,426, previously mentioned. The D.-C. buck-out circuit does not affect the A.-C. operation of the magnetometer as described above. When the ambient magnetic field is nearly balanced out in this manner, recorder 62 will indicate variations in the remaining portion experienced by element 400 and the precision obtainable on recorder 62 may therefore be made very high.

What I claim is:

1. A self-orienting magnetometer comprising a magnetic field responsive element producing an electrical signal in proportion to the intensity of the magnetic field along its principal axis of sensitivity, support means on which said element is rigidly mounted, an inductor coil rotatably mounted on said support on an axis which is parallel with the principal axis of said element, a second coil electrically connected to said inductor coil and electromagnetically coupled to said element, means for continuously rotating said inductor coil, a universal mounting for said support means, orienting servo means mechanically connected respectively to the axes of said universal mounting, and means electrically connected to said element responsive to quadrature components of modulation in the output of said element controlling respectively said servo means in a manner to restore the principal axis of said element to coincidence with the direction of the ambient magnetic field.

2. A self-orienting magnetometer comprising a magnetic field responsive element producing an electrical signal in proportion to the intensity of the magnetic field along its principal axis of sensitivity, support means on which said element is rigidly mounted, an inductor coil rotatably mounted on said support on an axis which is parallel with the principal axis of said element, a second coil electrically connected to said inductor coil and electromagnetically coupled to said element, means for continuously rotating said inductor coil, means for obtaining quadrature electrical signals which are related in phase to said rotation, a universal mounting for said support means, orienting servo means mechanically connected respectively to the axes of said universal mounting, and means electrically connected to said element responsive to quadrature components of modulation in the output of said element controlling respectively said servo means in a manner to restore the principal axis of said element to coincidence with the direction of the ambient magnetic field.

3. A self-orienting magnetometer comprising a magnetic field responsive element producing an electrical signal in proportion to the intensity of the magnetic field along its principal axis of sensitivity, support means on which said element is rigidly mounted, an inductor coil rotatably mounted on said support on an axis which is parallel with the principal axis of said element, a second coil electrically and mechanically connected to said inductor coil, said second coil encircling the axis of said element and electromagnetically coupled to said element, means for continuously rotating said coils, means for obtaining quadrature electrical signals which are related in phase to said rotation, a universal mounting for said support means, orienting servo means mechanically connected respectively to the axes of said universal mounting, and means electrically connected to said element responsive to quadrature components of modulation in the output of said element controlling respectively said servo means in a manner to restore the principal axis of said element to coincidence with the direction of the ambient magnetic field.

GARY MUFFLY.

REFERENCES CITED

The following references are of record in the file of this patent:

UNITED STATES PATENTS

| Number | Name | Date |
| --- | --- | --- |
| 2,468,554 | Hull | Apr. 26, 1949 |